United States Patent [19]
de Anda et al.

[11] Patent Number: 5,467,247
[45] Date of Patent: Nov. 14, 1995

[54] ELECTRONIC STUNNING APPARATUS

[76] Inventors: Richard N. de Anda, 1312 Lynnmere Dr., Thousand Oaks, Calif. 91360; Dale R. Hollis, 26000-A Alizia Canyon Dr., Calabasas, Calif. 91302

[21] Appl. No.: 165,468

[22] Filed: Dec. 13, 1993

[51] Int. Cl.⁶ .................................................. H05C 1/04
[52] U.S. Cl. ............................................................. 361/232
[58] Field of Search .................................... 361/230–232; 273/84 R, 84 ES

[56] References Cited

U.S. PATENT DOCUMENTS

| | | | |
|---|---|---|---|
| 3,625,222 | 12/1971 | Shimizu | 273/84 R X |
| 4,084,218 | 4/1978 | Kenney | 363/18 |
| 4,167,036 | 9/1979 | Kenney | 361/232 X |
| 4,667,431 | 5/1987 | Mendicino | 43/6 |
| 4,691,264 | 9/1987 | Schaffhauser | 361/232 |
| 4,719,534 | 1/1988 | Ward | 361/232 |

*Primary Examiner*—Howard L. Williams
*Assistant Examiner*—Fritz M. Fleming
*Attorney, Agent, or Firm*—Jack C. Munro

[57] ABSTRACT

An electrical stunning apparatus that is adapted to be held in the hand of a human and to be placeable in an activatable position by that human user. The electrical stunning apparatus is small in size and resembles a small, hand-holdable flashlight. This stunning apparatus utilizes a pair of contact probes which are not normally exposed, but are located in a hidden position beneath a retractable protective cap. Movement of the stunning apparatus into contact with the body of a human aggressor will cause the probes to be exposed, resulting in the transmission of an electrical shock of substantial magnitude to the human aggressor.

3 Claims, 2 Drawing Sheets

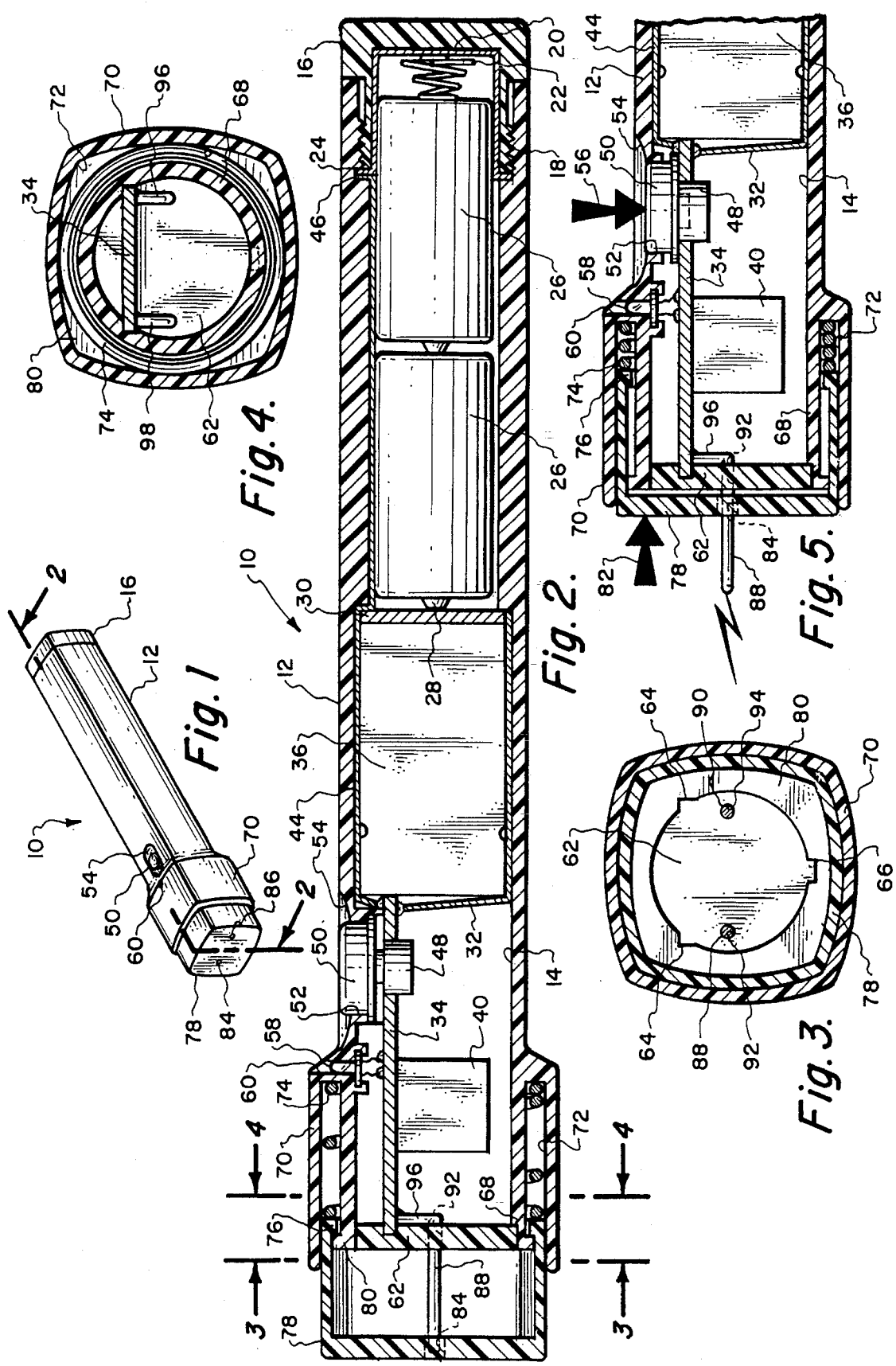

5,467,247

ELECTRONIC STUNNING APPARATUS

BACKGROUND OF THE INVENTION

1. Field of the Invention

The present invention relates to an electrical device designed to incapacitate a person by means of non-lethal electrical shock. The subject matter of this invention relates specific to devices for application by one human against another human, providing a means of self-defense for the first human against an assault by the second human.

2. Description of the Prior Art

A type of electronic defensive weapon has come into common use and is referred to as a "stun gun". Such a stun gun has become popular because of its immediate effectiveness for temporarily stunning and disabling a person against whom it is used while not causing permanent or substantial injury to the person.

The stun gun comprises a hand-held lightweight device having a pair of contact probes across which an arc is created when the device is energized with the probes contacting the human aggressor.

Stun guns of the prior art have had a couple significant deficiencies. The first deficiency is directed to its appearance. A human aggressor can normally readily observe a human carrying a conventional stun gun. The conventional stun gun has a rather unique appearance with the contact probes to be used against the aggressor being readily obvious. When the aggressor knows that an individual has in his or her possession such a device, the aggressor can proceed to take steps to avoid being contacted by the device in the performing of an assault on the human that is carrying the device. The second significant disadvantage of stun guns of the prior art is that such do not have sufficient power to completely disable the human aggressor with a single charge. Quite frequently some human aggressors are able to continue the assault even when being submitted to the charge of a stun gun of the prior art.

SUMMARY OF THE INVENTION

A stun gun which is small in size and basically resembles a short length of an elongated rod. The contact probes of the stun gun are not exposed but are mounted hidden under a retractable cap. Physical pressing movement of the cap in contact with the human aggressor will cause the probes to be exposed and directly contact or penetrate the skin of the aggressor thereby subjecting the aggressor to an electrical shock. The electrical shock is supplied by a circuit which is constructed to maximize the release of energy into the aggressor.

The primary objective of the present invention is to construct a stun gun which does not have an appearance of conventional stun guns.

Another objective of the present invention is to construct a stun gun which includes a circuit which provides for a significant amount of energy to be released into the body of a human aggressor while still maintaining that energy level below the level which could cause permanent damage to the aggressor or to any pacemaker type of electronic apparatus that the aggressor may have.

BRIEF DESCRIPTION OF THE DRAWINGS

FIG. 1 is an isometric view of the exterior surface of the stunning apparatus of the present invention showing the protective cap in the extended position with the contact probes not being exposed;

FIG. 2 is a longitudinal cross-sectional view of the stunning apparatus of the present invention taken along line 2—2 of FIG. 1;

FIG. 3 is a rearward directional, transverse, cross-sectional view through the protective cap of the stunning apparatus of the present invention taken along line 3—3 of FIG. 2;

FIG. 4 is a forward directional, transverse, cross-sectional view through the stunning apparatus of the present invention taken along line 4—4 of FIG. 2;

FIG. 5 is a longitudinal, cross-sectional view similar to FIG. 2 but showing the protective cap in the retracted position.

DETAILED DESCRIPTION OF THE SHOWN EMBODIMENT

Figure 6:
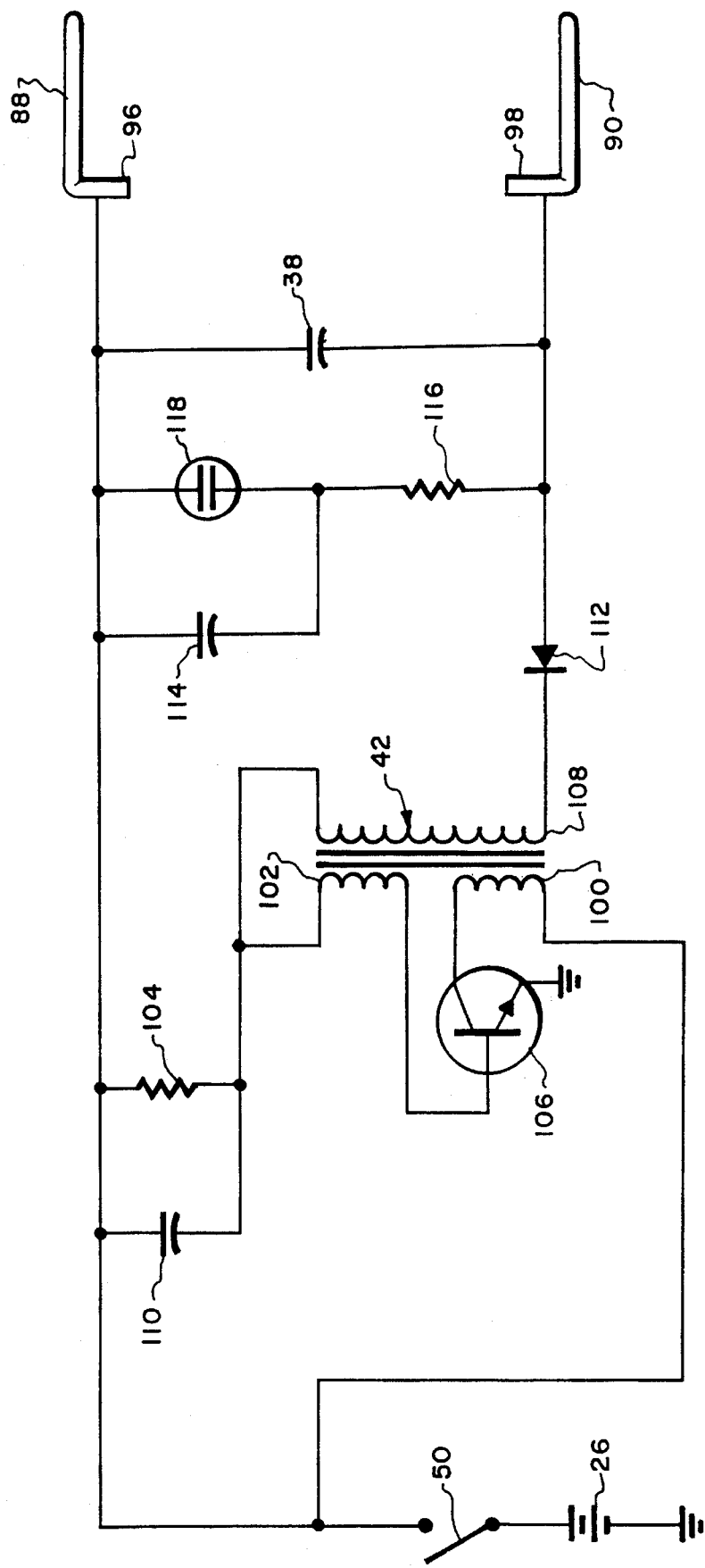
FIG. 6 is an electrical schematic of the electrical circuit utilized in conjunction with the stunning apparatus of the present invention.

Referring particularly to the drawings, there is shown the electronic stunning apparatus 10 of this invention. Stunning apparatus 10 includes a non-electrically conductive (preferably plastic) housing 12 which has an exterior square configuration in transverse cross section. The housing 12 is basically tubular and has an internal chamber 14. The back end of the housing 12 includes a cap 16 which is removably connected to the housing 12 by means of a series of screw threads 18. Within the interior of the cap 16 is an electrical grounding conductor 20 with this conductor 20 abutting against a coil spring 22. The conductor 20 is basically cup-shaped with its free outer edge being formed into an flange 24.

When the cap 16 is removed, batteries 26 are located in an in-line relationship within the internal chamber 14. The forwardmost battery of the batteries 26 has a positive terminal 28 which is in physical contact with an electrically conducting plate 30. Electrically connected with the plate 30 is a conductor 32. This conductor 32 connects to an appropriate terminal on a printed circuit (PC) board 34. The one end of the PC board 34 is mounted in grooves formed within the wall surface of the internal chamber 14 with these grooves not being shown. That same end of the PC board 34 abuts against a main capacitor housing 36. Contained within the main capacitor housing 36 is the main capacitor 38. That main capacitor 38 is electrically connected to appropriate terminals on the PC board 34 which are not shown.

Also mounted on the PC board 34 is a transformer housing 40. Within the transformer housing 40 there is located a step-up transformer in the form of an inverter 42. The inverter 42 is electrically connected within the circuit contained within the PC board 34. Also connected to the printed circuit board 34 is a grounding conductor 44. This grounding conductor 44 includes a rear flange 46 which abuts against and in electrical contact with the flange 24. It is to be understood that the grounding conductor 44 is not electrically connected to the mounting plate 30, but merely passes in close proximity thereto.

Also mounted on the PC board 34 is a cup 48. Supported by the cup 48 is a push button 50. The push button 50 is mounted within a hole 52 formed within the housing 12. Formed within the housing 12 surrounding the hole 52 is a fingering accessing recess 54. The push button 50 can be contacted physically by a human user and be pressed in an inward direction as represented by arrow 56. This inward position of the button 50 is shown in FIG. 5 of the drawings. Also electrically connected to the PC board 34 is an indicator light 58. The indicator light 58 is mounted within a hole 60 formed within the housing 12.

The front end of the PC board 34 is fixedly mounted within a mounting plate 62. This mounting plate 62 is basically circular in configuration with the exception of a pair of pointed protuberances 64 and the polygonal protuberance 66. The protuberances 64 and 66 snugly lock into the forward-most end 68 of the housing 12.

Between the forward-most end 68 and enlarged end 70 of the housing 12 is an annular chamber 72. Within this annular chamber 72 is located a coil spring 74. The coil spring 74 abuts against inner end 76 of a protective cap 78. The inner end is slightly enlarged which is to abut against outwardly extending flange 80 of the forward-most end 68 of the housing 12. This will prevent disengagement of the protective cap 78 from the housing 12. However, the protective cap 78 can be pushed in an inward direction as represented by arrow 82 which will move the protective cap 78 in a direction toward the housing 12 and compress the coil spring 74. This position is clearly shown in FIG. 5 of the drawings.

The protective cap 78 has a pair of holes 84 and 86. Hole 84 is to connect with contact probe 88 with hole 86 connecting with contact probe 90. The contact probes 88 and 90 are loosely mounted within their respective holes 84 and 86. Therefore, upon the protective cap 78 being moved from the outer position shown in FIG. 2 to the retracted position shown in FIG. 5, the contact probes 88 and 90 will be exposed.

The mounting plate 62 also has a pair of spaced-apart holes 92 and 94. The probes 88 and 90 are tightly mounted within their respective holes 92 and 94. The probe 88 has a rear transverse section 96 which is electrically connected to the PC board 34. In a similar manner the probe 90 has a rear transverse section 98 which is electrically connected to the PC board 34.

The operation of the stunning apparatus 10 of this invention is as follows: The human user is to hold the housing 12 in hand with the thumb of that hand being located on the button 50. When the human user perceives that a potentially dangerous situation is arising the human user presses the button 50. The indicator light 58 will be activated to indicate that the stunning apparatus 10 is charging. It only takes about one and one-half seconds of time for the stunning apparatus 10 to be fully charged. When the human user presses the protective cap 78 against a human aggressor, the probes 88 and 90 will be caused to protrude, their sharp pointed ends slightly embedding into the flesh of the aggressor. A significant electrical shock will then be discharged from the main capacitor 38 into the body of the aggressor. This electrical shock will be sufficient to temporarily immobilize the aggressor.

Once an electrical shock is transmitted to the aggressor, the stunning apparatus 10 will be disengaged from the body of the aggressor. The user will normally continue to press button 50 which will result in the stunning apparatus 10 recharging again within about one and one-half seconds. After this period of time the stunning apparatus 10 can then be reused if necessary on the same aggressor or on a second aggressor.

Referring particularly to FIG. 6 there is shown the schematic of the electrical circuit for the printed circuit board 34. Depressing of the push button 50 to the on position (closed) initiates the operation of the inverter 42. When this switch 50 is closed a three volt direct current electrical charge is transmitted from the batteries 26 simultaneously to the collector winding 100 and to the base winding 102 of the inverter 42. The voltage applied to the base winding 102 is limited to 5.88 milliamps by resistor 104. The current rises in the base winding 102 and when the voltage has risen to the switching threshold of transistor 106, the transistor 106 switches on (to saturation) and allows the three volts of direct current to be conducted to the collector winding 100 of the inverter 42. This begins an alternating on/off/on/off switching cycle which allows the three volts of direct current to be stepped up by the ratio of the collector winding to the secondary winding 108. The voltage created within the secondary winding 108 is approximately five hundred volts. The capacitor 110 is necessary for the duty cycle of the inverter 42 and also provides some transient protection for the transistor 106.

The five hundred volts of alternating current at the secondary winding 108 is rectified by diode 112 to direct current voltage. This direct current voltage is filtered by and stored within the main capacitor 38 for the eventful purpose of acting as an energy reservoir for the capacitive discharge into the human aggressor which occurs when the probes 88 and 90 are placed in contact with the aggressor. At the same time that capacitor 38 is being charged, capacitor 114 is being charged through resistor 116. When capacitor 114 has been charged to approximately sixty volts of direct current, neon bulb 118 becomes conductive. As neon bulb 118 conducts, it will emit a pulse of light which will discharge capacitor 114. This process is repeated each time there is sixty volts direct current available from either the rectified output of the inverter 42 or from the main capacitor 38. The neon bulb 118 is contained within the indicator light 58 and steadily flashes on and off. The resistor 116 and capacitor 114 in conjunction with neon bulb 118 form a "relaxation oscillator" with a frequency of approximately one Hertz. This "relaxation oscillator" provides the human user with a positive indication that the circuit is operating and ready for use. It is to be understood that the stunning apparatus 10 of this invention could also be used on animals, such as dogs.

What is claimed is:

1. An electrical stunning apparatus which is designed to be conveniently held in a hand of a human user, said electrical stunning apparatus being adapted to be used to stun a human aggressor, said electrical stunning apparatus to deliver an electrical shock to the human aggressor when contacting the skin of the aggressor with this shock being sufficient to temporarily immobilize the aggressor, said electrical stunning apparatus comprising:

a housing having an internal compartment, said housing adapted to be conveniently held in a hand of the user, said housing having a forward-most end and an enlarged end, said forward-most end being tubular defining an internal chamber, said enlarged end surrounding said forward-most end, an annular chamber located between said forward-most end and said enlarged end;

an electrical power source mounted within said internal compartment, a manually operable switch mounted on said housing, said manually operable switch usable to cause activation of said power source;

a pair of spaced-apart contact probes mounted on a mounting plate, said mounting plate being fixed to said forward-most end, said mounting plate covering said internal chamber, said contact probes to apply the electrical shock to the human aggressor upon touching of said contact probes to the human aggressor;

said housing having a protective cap, said protective cap being movable within said annular chamber between an extended position and a retracted position, with said protective cap in said extended position said protective cap covering said contact probes not exposing said contact probes, with said protective cap in said retracted position said contact probes being exposed; and said cap being connected to a biasing spring, said biasing spring exerting a constant bias tending to locate said protective cap in said extended position, said biasing spring being located in said annular chamber.

2. The apparatus as defined in claim 1 wherein:

said protective cap having a pair of spaced-apart holes, each said contact probe to connect with a said hole, movement of said protective cap from said extended position to said retracted position causes said contact probes to protrude from said holes.

3. The apparatus as defined in claim 1 wherein:

an electrical circuit being mounted within said internal compartment, said electrical circuit being electrically connected to said electrical power source, said electrical circuit being capable of storing electrical energy with said storage occurring by an alternating ON/OFF/ON/OFF switching cycle.

\* \* \* \* \*